United States Patent
Lin

(10) Patent No.: US 6,252,919 B1
(45) Date of Patent: Jun. 26, 2001

(54) RE-SYNCHRONIZATION OF INDEPENDENTLY-CLOCKED AUDIO STREAMS BY FADING-IN WITH A FRACTIONAL SAMPLE OVER MULTIPLE PERIODS FOR SAMPLE-RATE CONVERSION

(75) Inventor: Tao Lin, Fremont, CA (US)

(73) Assignee: Neomagic Corp., Santa Clara, CA (US)

( * ) Notice: Subject to any disclaimer, the term of this patent is extended or adjusted under 35 U.S.C. 154(b) by 0 days.

(21) Appl. No.: 09/215,507

(22) Filed: Dec. 17, 1998

(51) Int. Cl.[7] .............................. H04L 23/00; H04L 7/00
(52) U.S. Cl. ......................... 375/377; 375/355; 375/372
(58) Field of Search .................................... 375/377, 355, 375/371, 372, 373; 370/516, 513, 505; 327/153, 161; 348/537; 708/313

(56) References Cited

U.S. PATENT DOCUMENTS

| | | | |
|---|---|---|---|
| 4,020,332 | 4/1977 | Crochiere et al. ................. 235/152 |
| 4,612,568 | 9/1986 | Den Hollander et al. .......... 358/19 |
| 5,204,827 | 4/1993 | Fijita et al. ...................... 364/724.1 |
| 5,214,676 | * 5/1993 | Wilkinson ......................... 327/127 |
| 5,274,372 | 12/1993 | Luthra et al. ..................... 341/61 |
| 5,331,346 | 7/1994 | Shields et al. .................... 348/441 |
| 5,335,074 | * 8/1994 | Stec .................................. 348/537 |
| 5,398,029 | 3/1995 | Toyama et al. ................... 341/61 |
| 5,504,751 | * 4/1996 | Ledzius et al. ................... 375/355 |
| 5,532,749 | * 7/1996 | Hong ................................ 348/449 |
| 5,592,588 | 1/1997 | Reekes et al. .................... 395/2.87 |
| 5,647,008 | 7/1997 | Farhangi et al. .................. 381/119 |
| 5,712,635 | 1/1998 | Wilson et al. .................... 341/144 |
| 5,768,311 | 6/1998 | Betts et al. ....................... 375/222 |
| 6,028,671 | * 3/2001 | Paulos ............................... 375/355 |
| 6,061,410 | * 5/2000 | Linz .................................. 375/355 |

* cited by examiner

*Primary Examiner*—Tesfaldet Bocure
(74) *Attorney, Agent, or Firm*—Stuart T. Auvinen

(57) ABSTRACT

A net sample is added or removed from an audio sample stream by fading in or out fractional samples over many sample periods. A sample-rate converter has a FIFO that is written with an input sample by an input clock synchronized to the input audio stream. The samples are read from the FIFO by a derived clock. The derived clock is generated from an output clock using a nominal ratio of Q/P. Read and write counters for the FIFO are compared. When the write counter is ahead of the read counter by exactly a target amount the derived clock is a ratio of Q/P of the output clock. When the write counter is ahead of the read counter by more than the target, the read rate is increased by removing one net sample over many sample periods. When the write counter is ahead of the read counter by less than the target amount, the read rate is decreased by adding one net sample over many sample periods. Samples from a delayed stream from the FIFO are faded in (out) by gradually increasing (decreasing) a weighting of successive fractional samples from the delayed stream and decreasing (increasing) the weighting of successive input-stream samples. Fade-in occurs over many sample periods, such as 256, to reduce audible distortion.

20 Claims, 8 Drawing Sheets

$$X(N), \ X(N+1)\frac{M-1}{M} + X(N)\frac{1}{M}, \ X(N+2)\frac{M-2}{M} + X(N+1)\frac{2}{M}, \ X(N+3)\frac{M-3}{M} + X(N+2)\frac{3}{M},$$

$$\ldots, X(N+M-2)\frac{2}{M} + X(N+M-3)\frac{M-2}{M}, \ X(N+M-1)\frac{1}{M} + X(N+M-2)\frac{M-1}{M}, \ X(N+M-1)$$

FIG. 5A

FADE-IN OVER M=8

$$X(N), \ X(N+1)\frac{M-1}{M} + X(N+2)\frac{2}{M}, \ X(N+2)\frac{M-2}{M} + X(N+3)\frac{2}{M}, \ X(N+3)\frac{M-3}{M} + X(N+4)\frac{3}{M},$$

$$\ldots, X(N+M-2)\frac{2}{M} + X(N+M-1)\frac{M-2}{M}, \ X(N+M-1)\frac{1}{M} + X(N+M)\frac{M-1}{M}, \ X(N+M+1)$$

FIG. 5B

FADE-OUT OVER M=8

| F0 | F1 | Q | P |
| --- | --- | --- | --- |
| 11.025KHz | 48KHz | 147 | 640 |
| 22.050KHz | 48KHz | 294 | 640 |
| 44.100KHz | 48KHz | 588 | 640 |
| 8 KHz | 48KHz | 104 | 624 |
| 16 KHz | 48KHz | 208 | 624 |
| 24 KHz | 48KHz | 312 | 624 |
| 32 KHz | 48KHz | 416 | 624 |
| 48 KHz | 48KHz | 624 | 624 |

FIG. 7

RE-SYNCHRONIZATION OF INDEPENDENTLY-CLOCKED AUDIO STREAMS BY FADING-IN WITH A FRACTIONAL SAMPLE OVER MULTIPLE PERIODS FOR SAMPLE-RATE CONVERSION

FIELD OF THE INVENTION

This invention relates to sample-rate conversion in audio systems, and more particularly to dynamically adding or deleting samples to adjust the conversion ratio.

BACKGROUND OF THE INVENTION

Digital-audio systems are often found in inexpensive personal computers (PC's). Audio inputs are typically sampled at a rate of 11.025, 22.05, or 44.1 KHz, or at rates of 8, 16, 32, or 48 KHz. These audio samples are often stored and altered in a PC before being played back, often at a different rate.

It may be desired to play back an audio sample at a different rate, or to mix audio samples having different sample rates. One of the audio samples must be converted to the sample rate of the other audio sample for mixing or playback to occur. Sample-rate conversion software or hardware is used to convert the sample rate.

While many approaches to sample-rate conversion are used, satisfactory results are not always achieved. The human ear is quite sensitive to slight distortions or discontinuities of a sound. Coarse sample-rate conversion produces noticeable distortion.

A particular problem occurs when audio streams are synchronized to independent free-running clocks. The clocks for the two audio streams may be generated from two different crystal oscillators. Even when the frequencies are the same, slight differences can occur between the two crystals. The frequency difference may be up to 1000 parts-per-million (ppm). For a nominal 11,025 Hz sample rate, the frequency can be as high as 11025+11.025 or 11036 Hz. When a 11036 Hz audio signal synchronized to one crystal oscillator is converted to a 11025 Hz rate, audio samples may be deleted after every thousand or so samples. Deleting audio samples can cause audible clicks or pops.

Analog SRC—FIG. 1

FIG. 1 shows a prior-art sample-rate conversion using a pair of digital-analog converters. An input audio stream was sampled at frequency f0, and has samples x(0), x(1), ... x(m). Each sample is a multi-bit binary number representing the intensity of the sound at a point in time; 16-bit binary mumbers in two's complement are commonly used for each sample. The input sample at frequency f0 is to be converted to the output audio stream having a sample rate of f1, with samples y(0), y(1), ... y(n). The number of sample points in the input stream, m, often differs from the number of samples in the output stream, n. The ratio of the number of samples, m/n, is equal to the frequency ratio f0/f1. The converted audio stream must have the same total play time, even though the number of samples increases or decreases and the rate of sample play back likewise increases of decreases.

The digital input samples x(i) are converted to analog voltages on line 6 by digital-to-analog converter (DAC) 8. DAC 8 converts an input sample for each period of input clock 16, which operates at input frequency f0. The capacitance on line 6 maintains the voltage generated by DAC 8 until the next sample is converted.

The voltage on line 6 is sampled by analog-to-digital converter (ADC) 10, which generates a digital value representing the voltage sampled from line 6. This digital value is output as output sample y(i). ADC 10 samples the voltage on line 6 for each period of output clock 15, which operates at output frequency f1.

While such an analog sample converter may be considered exact, since DAC 8 and ADC 10 operate from independent clocks 15, 16, it is complex and expensive. The analog circuits are difficult to integrate with other digital circuits on a VLSI integrated circuit (IC). Also, the quality of the digital audio stream is degraded by the multiple analog-digital conversions.

FIFO with SRC—FIGS. 2, 3

FIG. 2 illustrates using a FIFO to buffer a sample-rate converter. First-in-first-out FIFO 12 is written with an input audio sample x(i) for each pulse of the input clock 16, which operates at input frequency f0. Sample-rate converter 14 is an all-digital converter that reads digital samples from FIFO 12 and outputs digital samples at the output frequency f1 in response to output clock 15. Sample-rate converter 14 generates derived clock 18 from output clock 15 by multiplying the output clock by Q and dividing by P. Thus derived clock 18 has a derived frequency f2 of (Q/P)*f1. Q and P are chosen so that f2 is about the same as input frequency f0. Thus FIFO 12 is read and written at about the same frequency.

When Q/P is not exactly the ratio of f0 to f1, FIFO 12 is read and written at slightly different rates. FIFO 12 can fill up or become empty. Samples can over-write earlier samples, or random or null data can be output as a sample. Thus simply using a FIFO can produce undesirable audio noise.

FIG. 3 shows using read and write pointers to control the FIFO buffering a sample-rate converter. Write counter 24 is clocked by input clock 16 while read counter 26 is clocked by derived clock 18. Thus write counter 24 keeps track of the write location in FIFO 12 while read counter 26 indicates the reading location in FIFO 12. Comparator 28 compares the values of write counter 24 and read counter 26 to determine when FIFO 12 is full or empty.

When write counter 24 matches read counter 26, FIFO 12 has become empty, and signal 30 causes FIFO 12 to continue to output the last audio sample, effectively duplicating an audio sample. When write counter 24 is ahead of read counter 26 by the size of FIFO 12, then comparator 28 detects that FIFO 12 is full. Input samples are prevented from being written into FIFO 12 until one or more samples have been read out to sample-rate converter 14. This essentially drops an audio sample.

Audible distortions can occur when FIFO 12 fills, since an input sample must be skipped rather than written to the full FIFO. When FIFO 12 becomes empty, a sample is missing and a previous sample may need to be duplicated, or a null or random sample output. While this is superior to simply allowing FIFO 12 to over-run or under-run, audible clicks or pops may still be discernable by the listener. Noise can occur when samples are abruptly added or deleted.

What is desired is a digital sample-rate converter for common PC-audio sampling rates. It is desired to buffer digital-audio samples synchronized to independent clocks that may vary slightly in frequency. A digital sample-rate converter is desired that can eliminate audible clicks and pops caused by slight mismatches of sampling rates. A sample-rate converter that adds or removes samples without audible distortion is also desirable. High audio quality is desirable when samples from independent crystal oscillators are used.

SUMMARY OF THE INVENTION

A sample-rate converter has an input stream of samples representing audio intensities at points in time. The input stream is for playing the samples at an input rate of an input clock. An output stream of samples represent audio intensities at points in time. The output stream is for playing the samples at an output rate of an output clock. A buffer receives the samples from the input stream in response to the input clock.

A derived-clock generator is coupled to the output clock. It generates a derived clock from the output clock. The buffer outputs samples in response to the derived clock to form a buffered stream. A delay register is coupled to the buffer. It delays samples in the buffered stream by a period of the derived clock. The delay register outputs a delayed stream.

A fade-in generator is coupled to the buffer and to the delay register. It fades in the delayed stream by gradually inserting an extra sample into a faded stream of samples by gradually increasing a weighting of samples from the delayed stream and gradually decreasing a weighting of samples from the buffered stream, the fade-in generator outputting the faded stream.

A filter stage is coupled to receive samples in the faded stream from the fade-in generator in response to a derived clock. It converts samples read from the buffer at a derived rate of the derived clock to output samples output at the output rate. A target indicator is coupled to the input clock and to the derived clock. It indicates when the buffer contains a target number of samples, and when the buffer contains less than the target or more than the target number of samples.

The fade-in generator outputs the buffered stream without fading in the delayed stream when the target indicator indicates that the buffer contains the target number of samples, but the fade-in generator fades in the delayed stream when the target indicator indicates that the buffer contains less than the target number of samples. Thus the fade-in generator adds a net sample by fading in the delayed stream in response to a number of samples stored in the buffer.

In further aspects of the invention the fade-in generator is also for fading out the delayed stream by gradually removing a sample from the faded stream of samples. A weighting of samples from the delayed stream is gradually decreased while a weighting of samples from the buffered stream is gradually increased. The fade-in generator fades out the delayed stream when the target indicator indicates that the buffer contains more than the target number of samples. Thus the fade-in generator removes a net sample by fading out the delayed stream in response to a number of samples stored in the buffer.

In further aspects the buffer is a first-in-first-out FIFO. The target indicator has a write counter coupled to the input clock. It indicates a write modulo of a number of samples written to the FIFO. A read counter is coupled to the derived clock. It indicates a read modulo of a number of samples read from the FIFO.

A comparator is for comparing a difference of the write modulo to the read modulo to the target number of samples. The comparator outputs an indication of when the FIFO contains a target number of samples, when the FIFO contains less than the target or more than the target number of samples. Thus read and write counters are compared to determine when the fade-in generator fades-in or fades-out the delayed stream.

BRIEF DESCRIPTION OF THE DRAWINGS

FIG. 5A shows an equation for the weighting of samples during a fade-in.

FIG. 5B shows an equation for the weighting of samples during a fade-out.

FIG. 7 is a table of values for Q and P for typical audio-rate conversions.

DETAILED DESCRIPTION

The present invention relates to an improvement in digital sample-rate converters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized sample-rate conversion for closely-matched sample frequencies can be performed by adding or removing samples from the sample stream. The inventor has realized that noise is introduced by abrupt sample addition or removal. Rather than abruptly adding or removing a sample, an additional sample is faded-in over many sample periods, or a sample is removed over many samples. When the fade-in is performed over many samples, such as over 256 samples, the amount of the change in any one sample period is small, being $1/256^{th}$ of the abrupt change for a 256-sample-period fade-in. Thus the abrupt change is smoothed out over many samples, significantly reducing any audible disturbance.

The FIFO counters can be used to determine when to fade-in or fade-out a sample. There are only three possible conditions of the read and write rates of the FIFO:
1. Read and Write rates match.
2. Read is faster than Write.
3. Read is slower than Write.

The read and write rates can match exactly, in which case the nominal Q/P ratio is correct. No samples are added or deleted. When the FIFO's read rate exceeds the write rate, reading must be slowed. A sample is duplicated over many clock cycles by a fade-in, resulting in one less read than write.

The third condition is when the write rate exceeds the read rate. Then reading must be accelerated. A sample is removed over many clock cycles by a fade-out, resulting in one more read than write.

Figure 1:
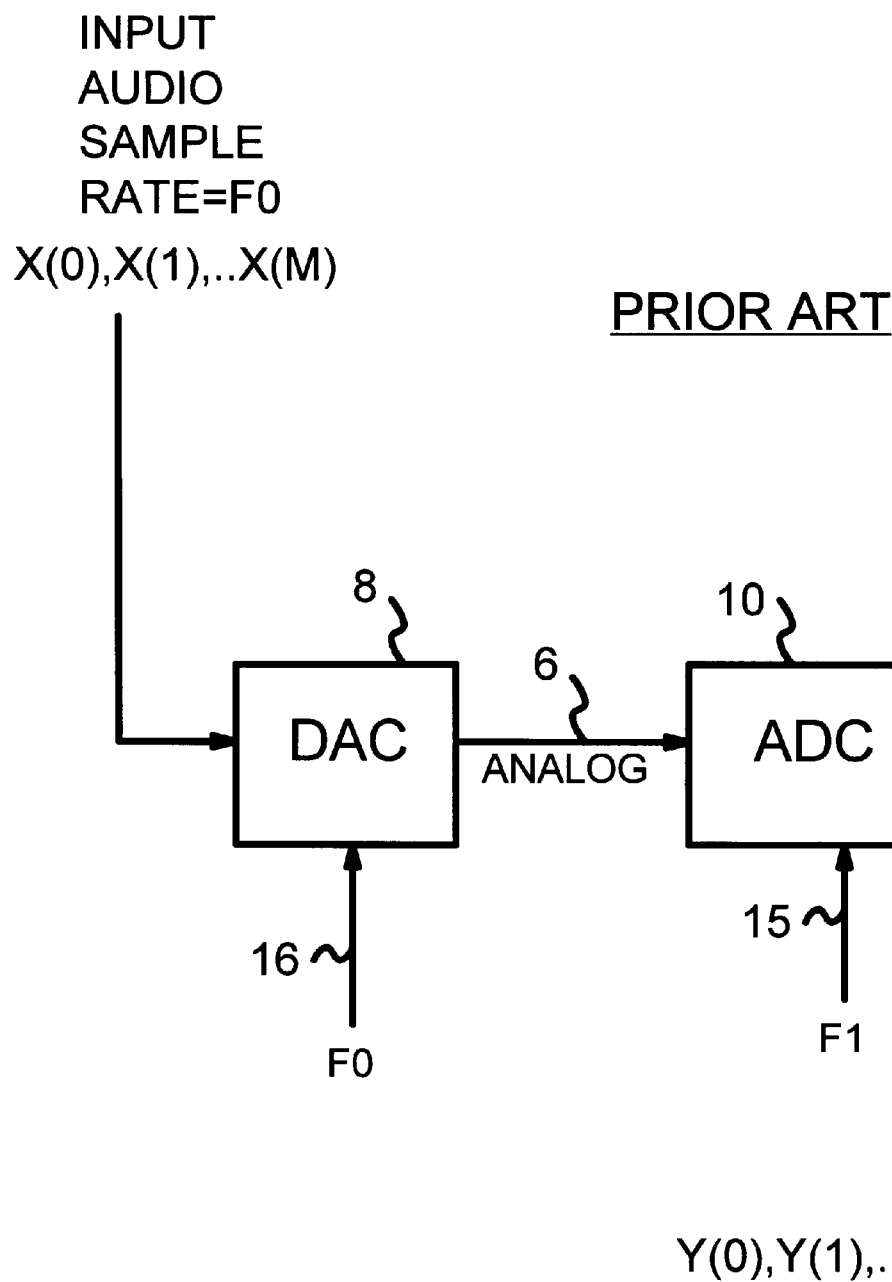
FIG. 1 shows a prior-art sample-rate conversion using a pair of digital-analog converters.
Figure 2:
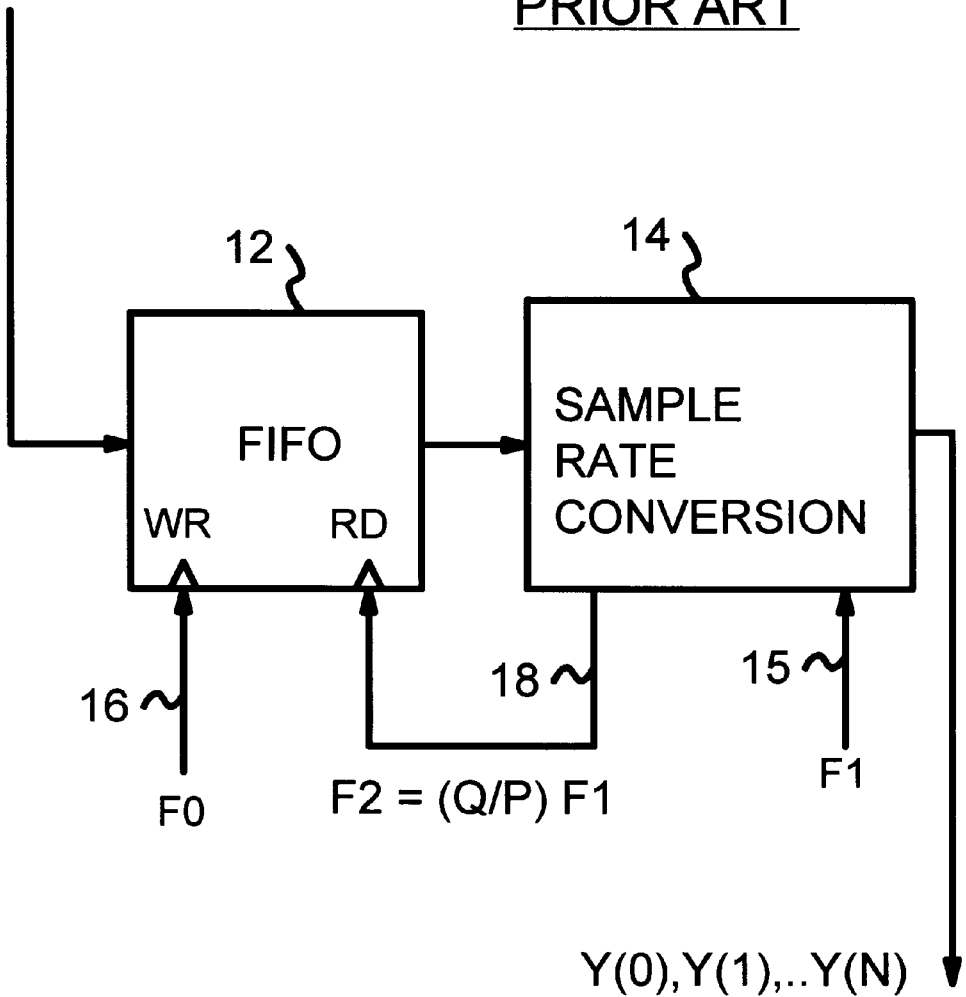
FIG. 2 illustrates using a FIFO to buffer a sample-rate converter.
Figure 3:
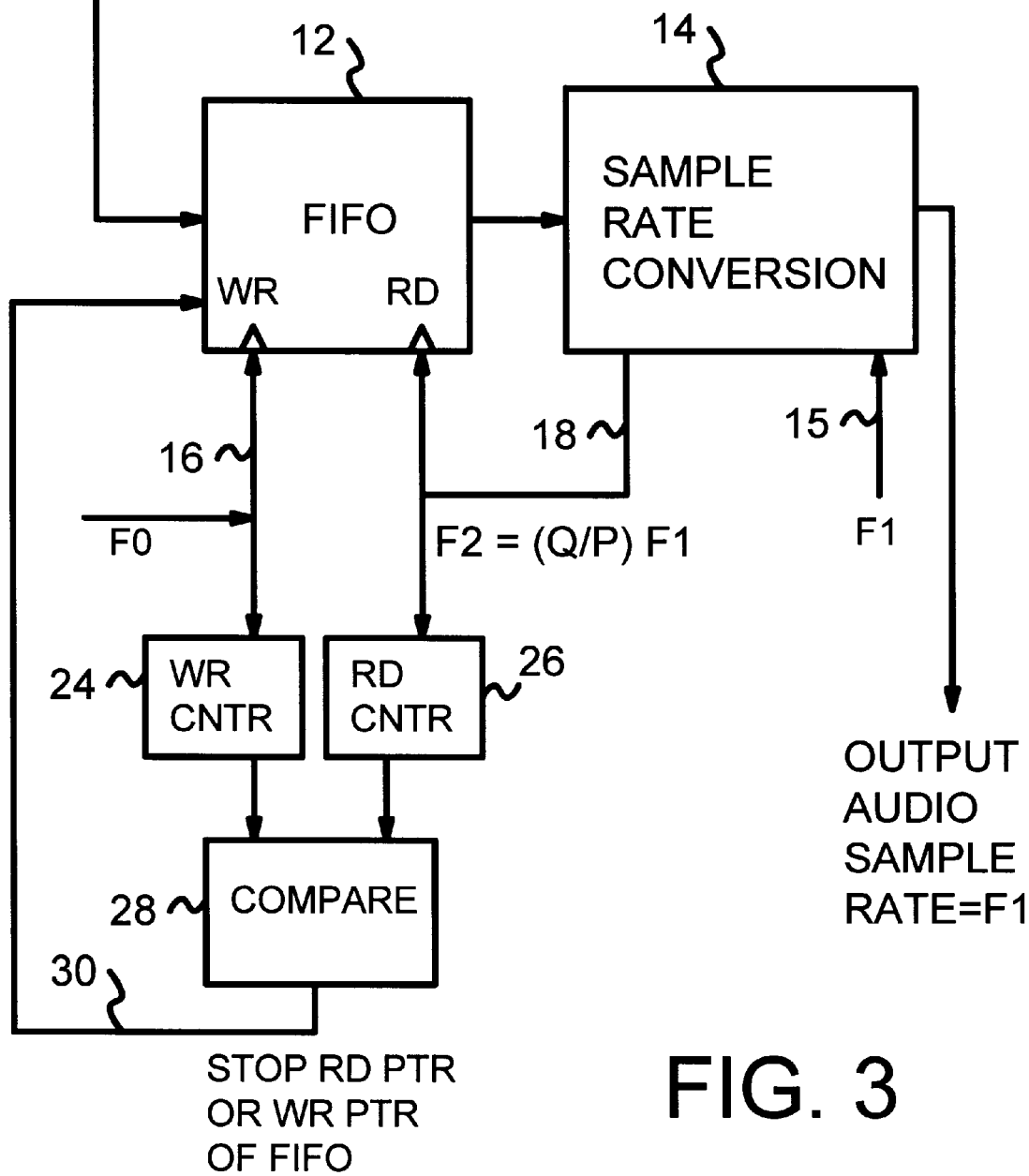
FIG. 3 shows using read and write pointers to control the FIFO buffering a sample-rate converter.
Figures 4A, 4B:
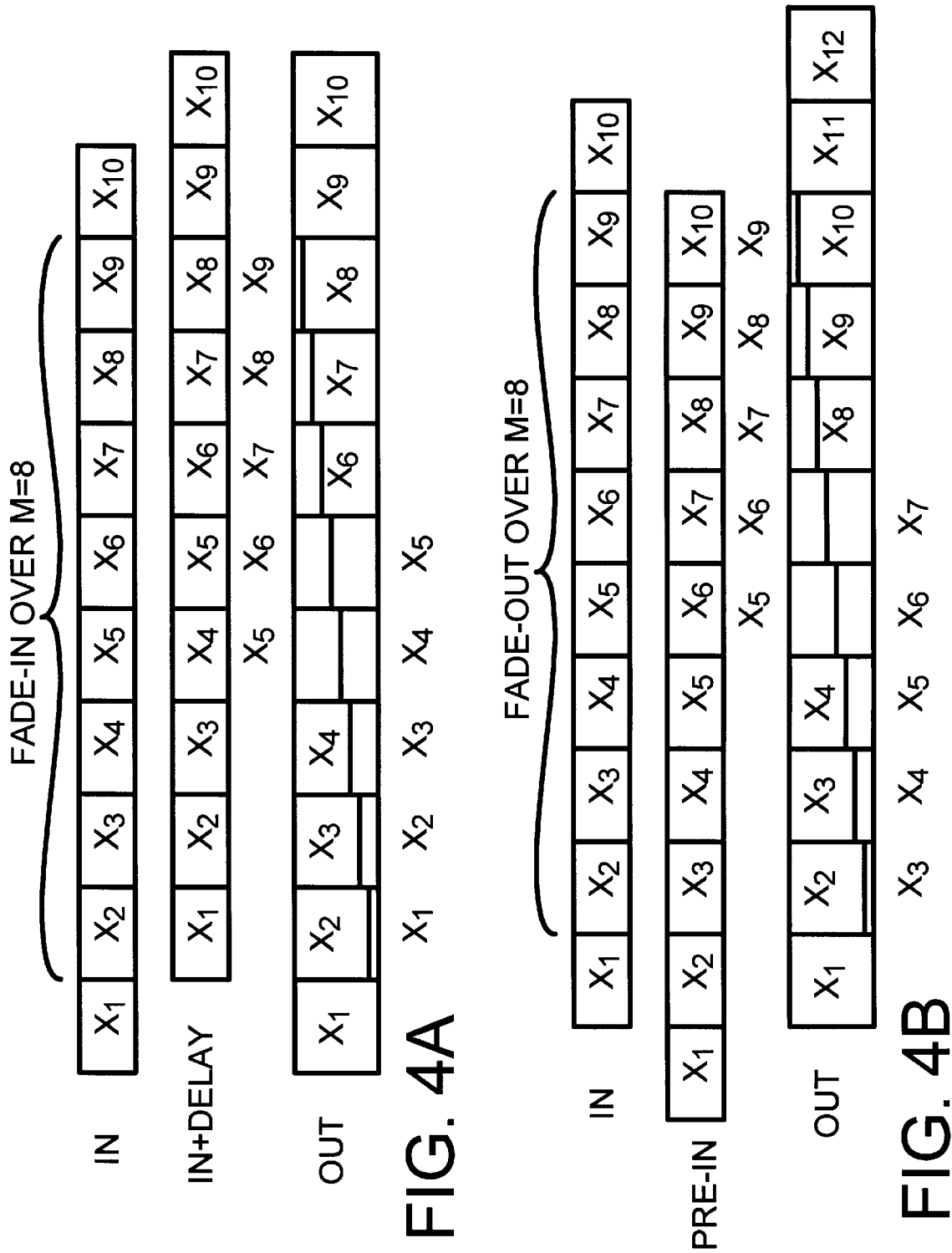
FIG. 4A is an example of fade-in of a sample over 8 samples.
FIG. 4B is an example of fade-out of a sample over 8 samples.

Fade-In Example—FIG. 4A

FIG. 4A is an example of fade-in of a sample over 8 samples. The inventor prefers much longer fade-in periods, such as m=256 samples; a fade-in period of m=8 samples is shown for clarity in the example.

An input stream IN has audio samples $X_1$, $X_2$, $X_3$, $X_4$, ...$X_9$, $X_{10}$, which are delayed by one sample period to generate a delayed input stream IN+DELAY of the same audio samples. The fade-in period begins with IN sample $X_2$ and ends with IN sample $X_9$, a total of 8 sample periods. For the delayed sample stream IN+DELAY, this fade-in period ranges from IN+DELAY sample $X_3$ to sample $X_{10}$.

The output is generated from stream IN at the beginning, but after the fade-in period is generated from delayed stream IN+DELAY. The result of the fade-in is that the output stream has an extra sample inserted into it, so that $X_9$ rather than $X_{10}$ is output in the sample period after the fade-in is complete. This is the same net result as simply duplicating one of the samples.

During the fade-in period, an additional sample is gradually added to the output stream. During the first sample period of the fade-in, the output sample is generated from $7/8^{ths}$ of IN sample $X_2$, and only $1/8^{th}$ of IN+DELAY sample $X_1$. During the second sample period of the fade-in, the output sample is generated from $6/8^{ths}$ of IN sample $X_3$, and $2/8^{ths}$ of IN+DELAY sample $X_2$. Continuing in the third sample period of the fade-in, the output sample is generated from $5/8^{ths}$ of IN sample $X_4$, and $3/8^{ths}$ of IN+DELAY sample $X_3$.

The IN samples are gradually faded out of the OUT stream, while the IN+DELAY samples are gradually faded in. Each sample period has 1/m (1/8) more of the sample from the stream being faded in, and 1/m (1/8) less of the sample from the stream being faded out. In the penultimate sample period of the fade-in, output sample is generated from $2/8^{ths}$ of IN sample $X_8$, and $6/8^{ths}$ of IN+DELAY sample $X_7$. Finally, in the last sample period of the fade-in, output sample is generated from $1/8^{th}$ of IN sample $X_9$, and $7/8^{ths}$ of IN+DELAY sample $X_8$. The OUT stream then continues with $X_9$, and $X_{10}$.

The IN stream is faded out while the IN+DELAY stream is faded in over m=8 sample periods. The overall result is one additional sample in the OUT stream, so the overall process of adding a sample is called fade-in. A sample is effectively duplicated, resulting in one less read from the FIFO.

Fade-Out Example—FIG. 4B

FIG. 4B is an example of fade-out of a sample over 8 samples. An input stream IN has audio samples $X_1$, $X_2$, $X_3$, $X_4$, ... $X_9$, $X_{10}$, which are delayed by one sample period relative to a preceding-stage early input stream PRE-IN of the same audio samples. The fade-out period begins with IN sample $X_2$ and ends with IN sample $X_9$, a total of 8 sample periods. For the early sample stream PRE-IN, this fade-out period ranges from PRE-IN sample $X_3$ to sample $X_{10}$.

The output is generated from stream IN at the beginning, but after the fade-out period is generated from early stream PRE-IN. The result of the fade-out is that the output stream has a sample removed from it, so that $X_{11}$ rather than $X_{10}$ is output in the sample period after the fade-out is complete. This is the same net result as simply removing one of the samples.

During the fade-out period, a sample is gradually removed from the output stream. During the first sample period of the fade-out, the output sample is generated from $7/8^{ths}$ of IN sample $X_2$, and only $1/8^{th}$ of PRE-IN sample $X_3$. During the second sample period of the fade-out, the output sample is generated from $6/8^{ths}$ of IN sample $X_3$, and $2/8^{ths}$ of PRE-IN sample $X_4$. Continuing in the third sample period of the fade-out, the output sample is generated from $5/8^{ths}$ of IN sample $X_4$, and $3/8^{ths}$ of PRE-IN sample $X_5$.

The IN samples are gradually faded out of the OUT stream, while the PRE-IN samples are gradually faded in. Each sample period has 1/m (1/8) more of the sample from the stream being faded in, and 1/m (1/8) less of the sample from the stream being faded out. In the penultimate sample period of the fade-out, output sample is generated from $2/8^{ths}$ of IN sample $X_8$, and $6/8^{ths}$ of PRE-IN sample $X_9$. Finally, in the last sample period of the fade-out, output sample is generated from $1/8^{th}$ of IN sample $X_9$, and $7/8^{ths}$ of PRE-IN sample $X_{10}$. The OUT stream then continues with $X_{11}$, and $X_{12}$.

The IN stream is faded out while the PRE-IN stream is faded in over m=8 sample periods. The overall result is one less sample in the OUT stream, so the overall process of removing a sample is called fade-out. A sample is effectively removed, resulting in one extra read from the FIFO.

Equations for Fade-in and Fade-Out—FIGS. 5A, 5B

FIG. 5A shows an equation for the weighting of samples during a fade-in. An input stream of audio samples X(n), X(n+1), X(n+2), . . . X(n+m−2), X(n+m−1), X(n+m) is increased in sampling rate by adding one net sample over m sample periods. The samples output are shown in the Figure.

Before fade-in begins, sample x(n) is output. Then, as the fade-in period begins, a weighted average of x(n+1) and x(n) is output. Sample x(n+1) is multiplied by the weighting factor (m−1)/m while sample x(n) is multiplied by the complementary weighting factor 1/m and the products summed to generate the weighted-average output. For the second sample output during the fade-in, sample x(n+2) is multiplied by the weighting factor (m−2)/m while sample x(n+1) is multiplied by the complementary weighting factor 2/m and the products summed to generate the second weighted-average output. The third output is sample x(n+3) multiplied by (m−3)/m added to sample x(n+2) multiplied by 3/m.

The penultimate sample output during the fade-in is sample x(n+m−2) multiplied by 2/m added to sample x(n+m−3) multiplied by (m−2)/m. The final sample output during the m-sample-period fade in is sample x(n+m−1) multiplied by 1/m added to sample x(n+m−2) multiplied by (m−1)/m. The sample output after the fade-in completes is x(n+m−1). Without fade-in, the sample output at this point would have been x(n+m), the next sample. Thus one more sample is output as a result of the fade-in.

FIG. 5B shows an equation for the weighting of samples during a fade-out. An input stream of audio samples X(n), X(n+1), X(n+2), X(n+m−2), X(n+m−1), X(n+m) is reduced in sampling rate by removing one net sample over m sample periods.

Before fade-out begins, sample x(n) is output. Then, as the fade-out period begins, a weighted average of x(n+1) and x(n+2) is output. Sample x(n+1) is multiplied by the weighting factor (m−1)/m while sample x(n+2) is multiplied by the complementary weighting factor 1/m and the products summed to generate the weighted-average output. For the second sample output during the fade-out, sample x(n+2) is multiplied by the weighting factor (m−2)/m while sample x(n+3) is multiplied by the complementary weighting factor 2/m and the products summed to generate the second weighted-average output. The third output is sample x(n+3) multiplied by (m−3)/m added to sample x(n+4) multiplied by 3/m.

The penultimate sample output during the fade-out is sample x(n+m−2) multiplied by 2/m added to sample x(n+m−1) multiplied by (m−2)/m. The final sample output during the m-sample-period fade in is sample x(n+m−1) multiplied by 1/m added to sample x(n+m) multiplied by (m−1)/m. The sample output after the fade-out completes is x(n+m+1). Without fade-out, the sample output at this point would have been x(n+m), the previous sample. Thus one less sample is output as a result of the fade-out.

Figure 6:
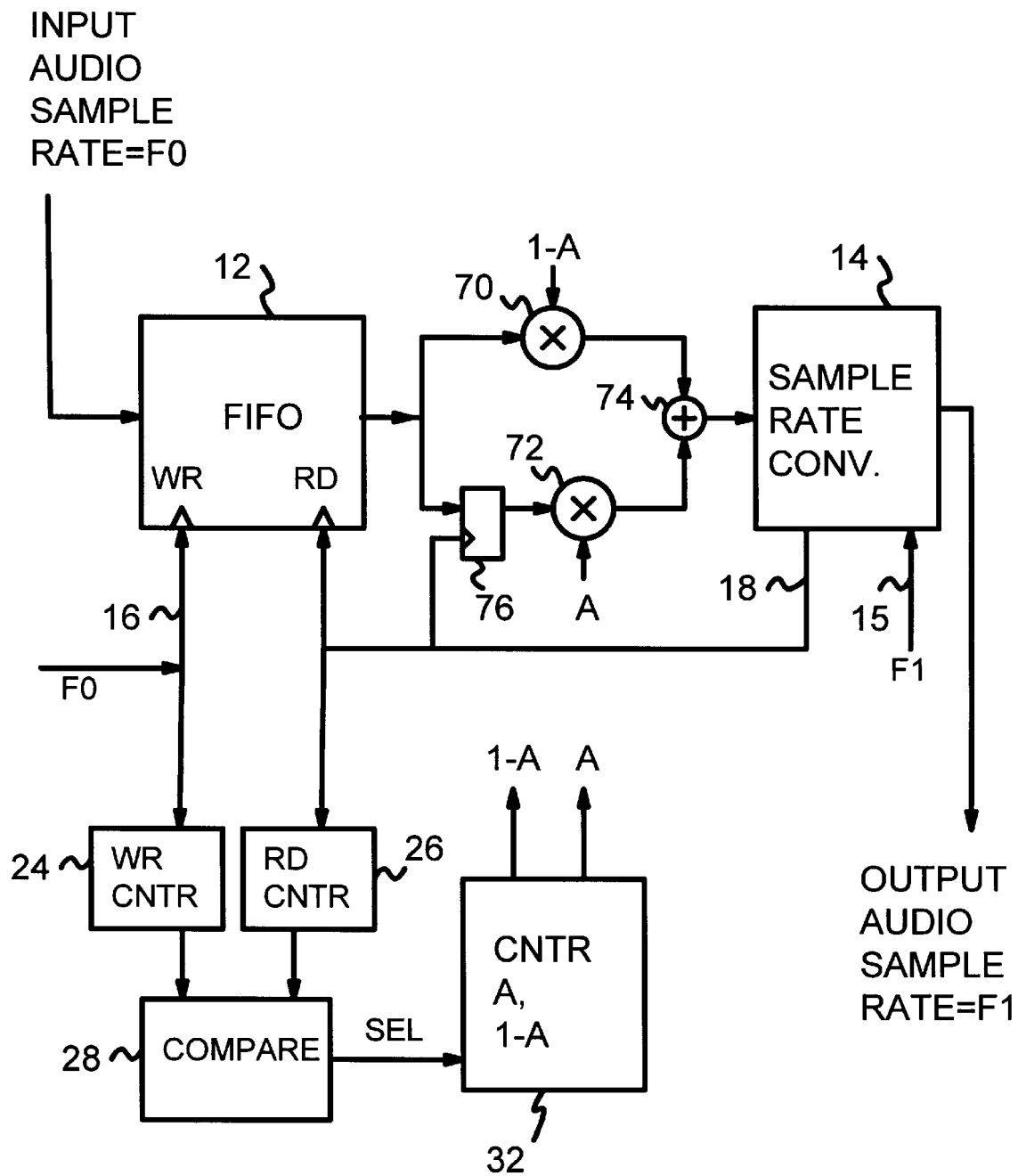
FIG. 6 shows a FIFO-buffered sample-rate converter that fades-in or fades-out a net sample over many sample periods as a function of the read and write positions in the FIFO.

Fade In/Out SRC—FIG. 6

FIG. 6 shows a FIFO-buffered sample-rate converter that fades-in or fades-out a net sample over many sample periods as a function of the read and write positions in the FIFO. An input audio stream was sampled at frequency f0, and has samples x(0), x(1), . . . x(i) . . . x(m). Each sample is a multi-bit binary number representing the intensity of the sound at a point in time; 16-bit binary numbers in two's complement are commonly used for each sample. The input sample at frequency f0 is to be converted to the output audio stream having a sample rate of f1, with samples y(0), y(1), . . . y(i). . . y(n). The number of sample points in the input stream, m, often differs from the number of samples in the output stream, n. The ratio of the number of samples, m/n, is equal to the frequency ratio f0/f1.

First-in-first-out FIFO 12 is written with an input audio sample x(i) for each pulse of the input clock 16, which operates at input frequency f0. Sample-rate converter 14 is an all-digital converter that reads digital samples output from FIFO 12 and outputs digital samples at the output frequency f1 in response to output clock 15.

Multipliers 70, 72, adder 74, and delay register 76 form a fader circuit that implements the equations of FIGS. 5A, 5B, where the weighting factors A and 1-A are generated by counter 32. Factor A corresponds to 1/m, 2/m, 3/m, etc. for fade-in, but (m−1)/m, (m−2)/m, (m−3)/m, etc. for fade-out. Factor A is multiplied in multiplier 72 by the samples delayed by delay register 76 while non-delayed or early samples are multiplied in multiplier 70 by factor 1-A. Adder 74 sums the weighted-sample products of multipliers 70, 72 and outputs a sample to sample-rate converter 14.

Sample-rate converter 14 is a synchronous SRC with a pre-determined ratio that does not vary during a sample stream being converted. Sample-rate converter 14 generates derived clock 18 from output clock 15 by multiplying the output clock by Q and dividing by P. Thus derived clock 18 has a derived frequency f2 of (Q/P)*f1. Q and P are chosen so that f2 is about the same as input frequency f0. FIFO 12 is therefore read and written at about the same frequency.

Write counter 24 is clocked by input clock 16 while read counter 26 is clocked by derived clock 18. Thus write counter 24 keeps track of the write location in FIFO 12 while read counter 26 indicates the reading location in FIFO 12. Comparator 28 compares the values of write counter 24 and read counter 26 to determine when FIFO 12 is filling or emptying.

Rather than determining when FIFO 12 is full, or when FIFO 12 is empty, comparator 28 compares the difference of the write and read pointers to a target. In a preferred embodiment the target is 2 for a 4-deep FIFO, so that the write location is two locations ahead of the read location. Other embodiments can use other targets, such as for larger FIFOs that are half-full.

When comparator 28 determines that write counter 24 is two ahead of read counter 26, FIFO 12 is on target. Comparator 28 signals counter 32 and control logic (not shown) to pass samples read from FIFO 12 through multiplier 70 and adder 74 without change. Parameter A is set to 0 so that 1-A is one, causing multiplier 72 to output a zero to adder 74. Alternatively, adder 74 and multipliers 70, 72 can be disabled or bypassed when FIFO 12 is on target.

When the input clock (frequency f0) is slower than the derived clock (frequency f2), FIFO 12 is being read too quickly. An extra sample needs to be added to the sample stream to sample-rate converter 14 by fade-in. Write counter 24 eventually becomes less than two locations ahead of read counter 26. Then comparator 28 detects that write counter 24 is one location ahead of read counter 26 and signals counter 32 to fade-in a sample. Counter 32 generates m factors A (1/m, 2/m, 3/m, etc.) that are applied to multiplier 72, fading in the delayed sample from delayed register 76. Finally the outputs from delay register 76 are output to sample-rate converter 76 rather than the non-delayed stream.

When the fade-in is complete, the read pointer and read counter are stopped for one clock and A is reset to zero. This causes write counter 24 to again be just two locations ahead of read counter 26, and also switches back to the non-delayed stream.

When the input clock (frequency f0) is faster than the derived clock (frequency f2), FIFO 12 is being read too slowly. Write counter 24 eventually becomes more than two locations ahead of read counter 26. Then comparator 28 detects that write counter 24 is three locations ahead of read counter 26 and signals counter 32 to fade-out a sample. The read pointer and the read counter are incremented by one extra clock edge and counter 32 generates m factors A ((m−1)/m, (m−2)/m, (m−3)/m, etc.) that are applied to multiplier 72, fading out the delayed sample from delayed register 76. Counter 32 also generates complementary factors 1-A (1/m, 2/m, 3/m, etc.) to multiplier 70. Finally the outputs from delay register 76 are not output to sample-rate converter 76; instead the non-delayed (PRE-IN) stream through multiplier 70 is output.

The extra clock applied to the read pointer and counter causes write counter 24 to again be just two locations ahead of read counter 26. After m samples, A becomes zero and the fading-out process completes. A stays zero until the next fade-in or fade-out.

The sampling ratio is thus adjusted slightly by the fade-in/fade-out circuit using the weighting factors generated by counter 32. This keeps FIFO 12 filled to the target of two samples.

The reading and writing rates must not vary by larger amounts, because fading in or out one sample over m sample periods must be sufficient for the read rate to catch up to the write rate. When crystal oscillators are guaranteed to match within 1000 ppm, fading over m=256 is sufficient. Lower-quality crystals may require that the fade-in period m be reduced to 64 or less.

Q and P Values—FIG. 7

FIG. 7 is a table of values for Q and P for typical audio-rate conversions. Input sampling rates f0 from 11.025

KHz to 48 KHz are converted to a standard 48 KHz rate. When the input samples are synchronized to an independent 48-KHz clock, both Q and P are set to 624. The invention can then adjust the samples for differences in the two 48 KHz clocks to be within 1000 ppm by adjusting the ratio from 624/624 to 625/624 or 623/624.

Values for P are 640 or 624, while values of Q range from 104 to 624. Large values of P and Q allow for more accurate conversion and filtering.

Figure 8:
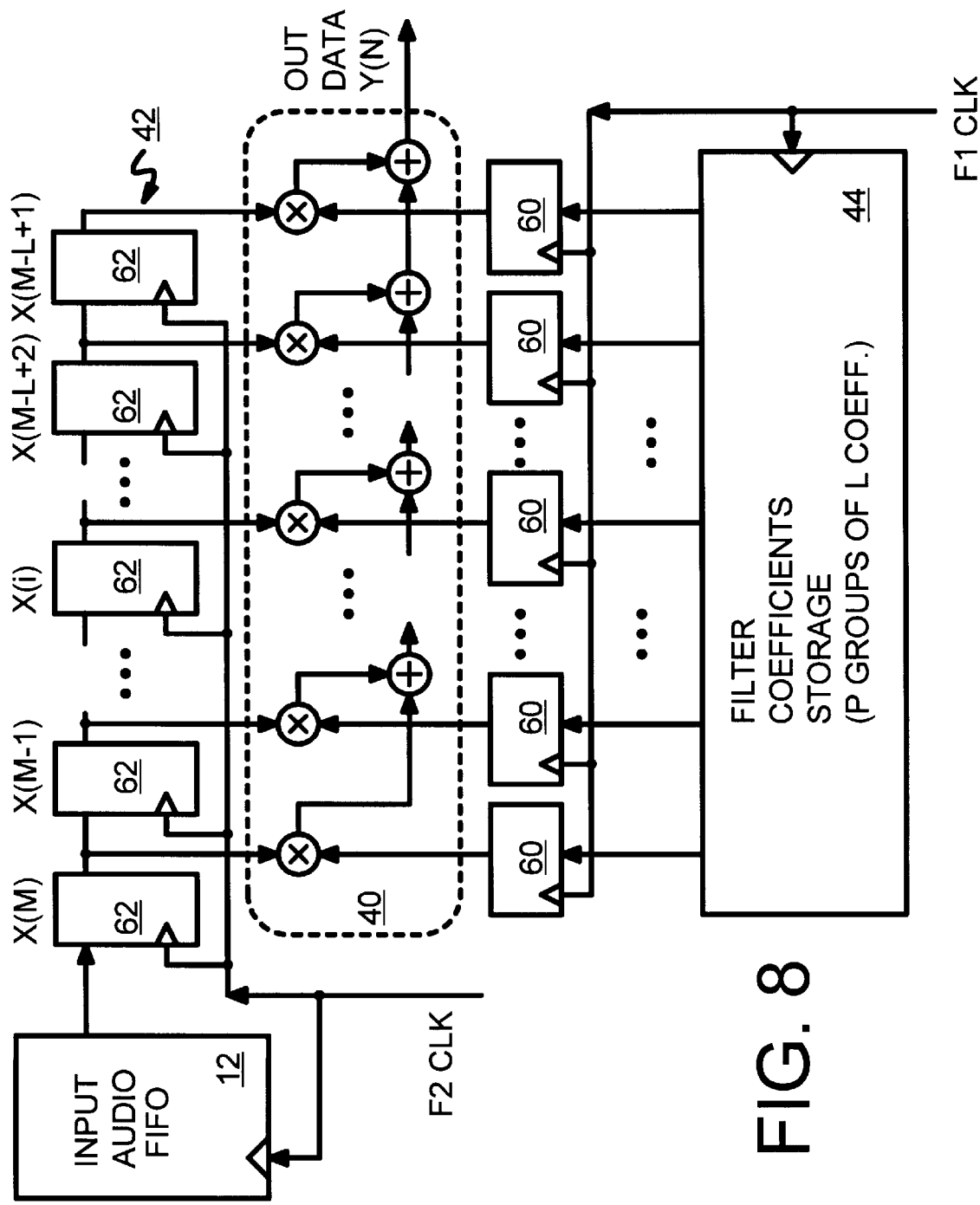
FIG. 8 is a diagram of a convolution filter used for sample-rate conversion.

Convolution Filter—FIG. 8

FIG. 8 is a diagram of a convolution filter used for sample-rate conversion. Convolution filter 40 is implemented as a DSP engine that multiplies or scales each sample in shift register 42 by a coefficient from coefficient storage 44. The scaled samples are then summed by the DSP implementing convolution filter 40 to output sample y(i). A different output sample y(i) is generated for each pulse of the output clock F1 CLK.

The output clock F1 clock also shifts a new group of coefficient from coefficient storage 44 to staging registers 60 for use in generating the current output sample y(i). The derived clock F2 clock is applied to the read-clock control input of FIFO 12 and to each flip-flop 62 in shift register 42 so that each sample read from FIFO 12 is shifted down the chain of flip-flops 62. Since there are L flip-flops 62 for the L-tap filter, L input samples are used for generating one output sample. Each group of coefficients includes L coefficients that are loaded into L staging registers 60.

ADVANTAGES OF THE INVENTION

A digital sample-rate converter converts common PC-audio sampling rates by adding or removing one net sample over many sample periods. Digital-audio samples are buffered by a FIFO. The digital-audio samples are synchronized to independent clocks that may vary slightly in frequency. The digital sample-rate converter eliminates audible clicks and pops caused by slight mismatches of sampling rates. High audio quality is produced even when samples from independent, asynchronous crystal oscillators are used.

The sample-rate converter can easily be integrated on a larger system chip since the sample-rate converter is all digital. Samples can be faded-in or faded-out over varying numbers of samples. Fewer sample periods (m) allow for more rapid rate adjustments, while more sample periods provides better smoothing and less audible distortion. The fader circuit has a simple, straightforward interface using a conventional sample-rate-conversion circuit with a pre-determined rate.

Only two multiplies and one add are needed. Using the distributive property, two 16-bit additions and one 17×8-bit multiply are needed for one channel of 16-bit audio samples. Thus the additional hardware for fade-in is minimal. The fade-in period (m) can be software-programmable, allowing for user adjustments.

ALTERNATE EMBODIMENTS

Several other embodiments are contemplated by the inventor. For example the input audio could be a serial bit stream. Then a serial-to-parallel converter is used. Binary counters with a modulo equal to the size of the FIFO are normally used for the read and write counters, but other kinds of counters may be substituted. Other arrangements for the comparators and module counters are possible. These may also be implemented in the DSP's firmware. While the values for Q, and P are thought to be optimized values, other values are possible which still reduce the coefficient storage requirements, although perhaps not as significantly.

The DSP can be a simplified DSP core or a more complex general-purpose DSP. The functions of the DSP can be reduced to hardware logic gates, either performing the multiplication and addition operations serially or in parallel. The audio sample-rate converter can be integrated into an audio controller integrated circuit chip, or as part of a larger system chip such as an integrated multimedia controller which includes a graphics controller. The sample-rate converter can also be integrated with an audio A/D or D/A converter.

The target difference between the write and read counters can be other values besides 2, such as half or quarter the FIFO size. The target can also be a range of values, such as 2–4. Rather than using two counters and a comparator, a single up-down counter could be used that is incremented by each write and decremented by each read. The FIFO could follow the convolution filter rather than precede it by making some modifications. The FIFO is written by the derived clock from the SRC while the FIFO is read by the output clock. The derived clock is derived from the input clock in this alternate embodiment. Rather than using the SRC block to generate the derived clock, other clock generators such as counters, dividers, multipliers, and PLLs can be used. The fader circuit could also be implemented as a firmware or software routine in a DSP or a general-purpose processor. The multipliers in the fader could be shared in a time-multiplexed arrangement.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A sample-rate converter comprising:
   an input stream of samples representing audio intensities at points in time, the input stream for playing the samples at an input rate of an input clock;
   an output stream of samples representing audio intensities at points in time, the output stream for playing the samples at an output rate of an output clock;
   a buffer for receiving the samples from the input stream in response to the input clock;
   a derived-clock generator, coupled to the output clock, for generating a derived clock from the output clock, the buffer outputting samples in response to the derived clock to form a buffered stream;
   a delay register, coupled to the buffer, for delaying samples in the buffered stream by a period of the derived clock, the delay register outputting a delayed stream;
   a fade-in generator, coupled to the buffer and coupled to the delay register, for fading in the delayed stream by gradually inserting an extra sample into a faded stream of samples by gradually increasing a weighting of samples from the delayed stream and gradually decreasing a weighting of samples from the buffered stream, the fade-in generator outputting the faded stream;
   a filter stage, coupled to receive samples in the faded stream from the fade-in generator in response to a derived clock, for converting samples read from the buffer at a derived rate of the derived clock to output samples output at the output rate; and a target indicator, coupled to the input clock and coupled to the derived clock, for indicting when the buffer contains a target number of samples, and for indicating when the buffer contains less than the target or more than the target number of samples;

wherein the fade-in generator outputs the buffered stream without fading in the delayed stream when the target indicator indicates that the buffer contains the target number of samples, but the fade-in generator fading in the delayed stream when the target indicator indicates that the buffer contains more than the target number of samples, whereby the fade-in generator adds a net sample by fading in the delayed stream in response to a number of samples stored in the buffer.

2. The sample-rate converter of claim 1 wherein the fade-in generator is also for fading out the delayed stream by gradually removing a sample from the faded stream of samples by gradually decreasing a weighting of samples from the delayed stream and gradually increasing a weighting of samples from the buffered stream;

wherein the fade-in generator fades out the delayed stream when the target indicator indicates that the buffer contains less than the target number of samples, whereby the fade-in generator removes a net sample by fading out the delayed stream in response to a number of samples stored in the buffer.

3. The sample-rate converter of claim 1 wherein the buffer is a first-in-first-out FIFO.

4. The sample-rate converter of claim 3 wherein the target indicator comprises:

a write counter, coupled to the input clock, for indicating a write modulo of a number of samples written to the FIFO;

a read counter, coupled to the derived clock, for indicating a read modulo of a number of samples read from the FIFO; and a comparator for comparing a difference of the write modulo to the read modulo to the target number of samples, the comparator outputting an indication of when the FIFO contains a target number of samples, when the FIFO contains less than the target or more than the target number of samples, whereby read and write counters are compared to determine when the fade-in generator fades-in or fades-out the delayed stream.

5. The sample-rate converter of claim 4 wherein the fade-in generator comprises:

a first multiplier, receiving samples from the buffered stream, for multiplying successive samples by first weighting factors to generate first weighted samples;

a second multiplier, receiving samples from the delayed stream, for multiplying successive samples by second weighting factors to generate second weighted samples; and an adder, receiving the first and second weighted samples, for adding first weighted samples to the second weighted samples to produce samples in the faded stream;

whereby the fade-in generator performs a weighting average of the buffered stream and the delayed stream to fade-in a net sample into the faded stream.

6. The sample-rate converter of claim 5 wherein the first and second multipliers and the adder are routines executed by a digital-signal processor (DSP) or a general-purpose processor.

7. The sample-rate converter of claim 5 wherein the fade-in generator is disabled when the target indicator indicates that the FIFO contains the target number of samples.

8. The sample-rate converter of claim 5 wherein when the target indicator indicates that the FIFO contains the target number of samples, the first weighting factors are one and the second weighting factors are zero, or first weighting factors are zero and the second weighting factors are one;

wherein the first weighting factors are decreased in increments of 1/m from one to zero and the second weighting factors are increased in increments of 1/m from zero to one when the target indicator indicates that the FIFO contains less than the target number of samples;

wherein the first weighting factors are increased in increments of 1/m from zero to one and the second weighting factors are decreased in increments of 1/m from one to zero when the target indicator indicates that the FIFO contains more than the target number of samples;

wherein m is whole number;

whereby the fade-in generator fades in a net sample by weighting successive samples in the delayed stream with successive samples in the buffered stream.

9. The sample-rate converter of claim 8 further comprising:

a counter, coupled to the comparator, for decrementing the first weighting factors by a decrement of 1/m when the target indicator indicates that the FIFO contains less than the target number of samples, but for incrementing the first weighting factors by an increment of 1/m when the target indicator indicates that the FIFO contains more than the target number of samples.

10. The sample-rate converter of claim 9 wherein m is a number of sample periods that the fade-in generator adds a net sample.

11. The sample-rate converter of claim 10 wherein m is 256 sample periods, wherein a net sample is faded in over at least 256 successive samples, whereby audible distortions caused by abrupt addition of a sample are reduced.

12. The sample-rate converter of claim 3 wherein a conversion ratio of the input rate to the output rate is represented by Q/P, where Q and P are mutually-prime integers not having a common multiple when the input rate substantially differs from the output rate;

wherein a nominal frequency is Q/P times the output rate;

wherein the derived clock has a constant frequency being the normal frequency;

whereby the conversion ratio is altered by fading in a sample and not by adjusting the derived-clock generator to adjust sampling conversion.

13. The sample-rate converter of claim 12 wherein Q is greater than 100 and P is between 600 and 700 for audio conversion to 48 KHz.

14. The sample-rate converter of claim 12 wherein the filter stage further comprises:

a shift register, responsive to the derived clock and coupled to receive samples read from the FIFO, for storing a plurality of L samples;

a finite-impulse-response (FIRM) filter, coupled to receive the plurality of L samples from the shift register, for generating an output sample for each pulse of the output clock by scaling each of the plurality of L samples by L coefficients to produce scaled samples, and summing the scaled samples to generate the output sample;

coefficient storage, coupled to supply the L coefficients to the FIR filter, the coefficient storage storing P groups of L coefficients, whereby the plurality of L input samples from the FIFO are filtered to generate each output sample.

15. The sample-rate converter of claim 14 wherein the FIR filter is a routine executed by a digital-signal processor (DSP) or a general-purpose processor.

16. The sample-rate converter of claim 14 wherein when the input rate and the output rate are about equal, but the input clock is generated by a different crystal oscillator than the output clock so that the input clock and output clock are asynchronous, the fade-in generator adding or removing samples from the input stream to the output stream without abruptly duplicating or deleting samples from the input stream, whereby audible click and pop distortion is reduced.

17. The sample-rate converter of claim 3 wherein when the input rate and the output rate are about equal, but the input clock is generated by a different crystal oscillator than the output clock so that the input clock and output clock are asynchronous, Q and P are equal, wherein Q is a large integer exceeding 100.

18. A computer-implemented method for converting sample rates, the method comprising:

receiving an input clock at an input rate and writing an input sample to a FIFO for each pulse of the input clock;

receiving an output clock at an output rate and generating an output sample for each pulse of the output clock;

generating from the output clock a derived clock having a derived rate;

when the FIFO contains a target number of samples, outputting samples from the FIFO as the output samples;

when the FIFO contains less than the target number of samples:
  reading an intermediate sample from the FIFO;
  delaying each intermediate sample read from the FIFO by a period of the output clock to generate delayed samples;
  multiplying an intermediate sample by a first weighting factor of $(m-1)/m$ to generate a first sample;
  multiplying a delayed sample by a second weighting factor of $1/m$ to generate a second sample;
  summing the first and second samples to generate an output sample;
  decreasing the first weighting factor by $1/m$ and increasing the second weighting factor by $1/m$;
  continuing to process successive samples by multiplying by first and second weighting factors and summing to generate output samples until m output samples have been generated;

when the FIFO contains more than the target number of samples:
  reading the intermediate sample from the FIFO;
  delaying each intermediate sample read from the FIFO by a period of the output clock to generate delayed samples;
  multiplying an intermediate sample by a first weighting factor of $1/m$ to generate a first sample;
  multiplying a delayed sample by a second weighting factor of $(m-1)/m$ to generate a second sample;
  summing the first and second samples to generate the output sample;
  increasing the first weighting factor by $1/m$ and decreasing the second weighting factor by $1/m$;
  continuing to process successive samples by multiplying by first and second weighting factors and summing to generate output samples until m output samples have been generated, whereby a net sample is faded in or faded out over m samples in response to a number of samples in the FIFO.

19. A sampling-rate converter comprising:

an input clock for synchronizing input samples;

an output clock for synchronizing output samples;

a derived-clock generator for generating a derived clock from the input clock, the derived clock having a rate about equal to a rate of the output clock;

a digital converter, receiving the input samples in response to the input clock and outputting converted samples in response to the derived clock;

fader means, receiving the converted samples from the digital converter, for fading-in a net sample by gradually fading-in samples from a delayed stream of the converted samples, and for fading-out a net sample by gradually fading-out samples from the delayed stream, to generate a faded stream, the fader means including weighted-average means for adding gradually decreasing portions of converted samples to gradually increasing portions of samples from the delayed stream when fading-in the net sample, and for adding gradually increasing portions of converted samples to gradually decreasing portions of samples from the delayed stream when fading-out the net sample;

a FIFO, coupled to the fader means, for receiving converted samples in the faded stream, and for outputting output samples in response to the output clock;

a FIFO-fill indicator, coupled to the output clock and coupled to the derived clock, for indicting when the FIFO contains a target number of samples, and for indicating when the FIFO contains less than the target or more than the target number of samples;

wherein the fader means generator passes samples without alteration when the FIFO-fill indicator indicates that the FIFO contains the target number of samples, but the fader means gradually fading in a net sample over m samples when the FIFO-fill indicator indicates that the FIFO contains less than the target number of samples, the fader means gradually fading out a net sample over m samples when the FIFO-fill indicator indicates that the FIFO contains more than the target number of samples, whereby the fader means gradually adds or removes the net sample over m samples in response to a number of samples stored in the FIFO.

20. The sampling-rate converter of claim 18 wherein the derived clock is generated by a different crystal oscillator than the output clock.

* * * * *